(12) United States Patent
Lee et al.

(10) Patent No.: US 9,868,640 B2
(45) Date of Patent: Jan. 16, 2018

(54) GRAPHENE STRUCTURE AND METHOD OF MANUFACTURING THE SAME

(71) Applicant: SAMSUNG ELECTRONICS CO., LTD., Suwon-si, Gyeonggi-do (KR)

(72) Inventors: Eun-kyung Lee, Seoul (KR); Byoung-lyong Choi, Seoul (KR); Jae-hyun Lee, Suwon-si (KR); Dong-mok Whang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 14/929,842

(22) Filed: Nov. 2, 2015

(65) Prior Publication Data

US 2016/0052788 A1    Feb. 25, 2016

Related U.S. Application Data

(62) Division of application No. 13/681,955, filed on Nov. 20, 2012, now abandoned.

(30) Foreign Application Priority Data

Nov. 25, 2011    (KR) .................. 10-2011-0124398

(51) Int. Cl.
*H01B 1/24*    (2006.01)
*C01B 31/04*   (2006.01)
(Continued)

(52) U.S. Cl.
CPC .......... *C01B 31/0453* (2013.01); *B82Y 30/00* (2013.01); *B82Y 40/00* (2013.01); *C01B 32/186* (2017.08); *C01B 32/194* (2017.08); *H01B 1/04* (2013.01); *Y10S 977/734* (2013.01); *Y10S 977/773* (2013.01)

(58) Field of Classification Search
CPC ..... H01L 29/1606; B82Y 30/00; B82Y 40/00; H01B 1/04; H01B 1/24; C01B 32/186; C01B 32/194
USPC ...... 252/502, 500, 512; 429/231.8; 977/843, 977/890, 891; 427/255.28
See application file for complete search history.

(56) References Cited

U.S. PATENT DOCUMENTS

2007/0212538 A1    9/2007  Niu
2009/0057649 A1    3/2009  Sutter et al.
(Continued)

FOREIGN PATENT DOCUMENTS

JP    2005-105365 A    4/2005
JP    2010-261085 A    11/2010
(Continued)

OTHER PUBLICATIONS

Hailiang Wang et al., "Graphene-Wrapped Sulfur Particles as a Rechargeable Lithium-Sulfur Battery Cathode Material with High Capacity and Cycling Stability", Nano Letter, 2011, 11 (7), pp. 2644-2647, URL: http://pubs.acs.org/doi/abs/10.1021/nl200658a.
(Continued)

*Primary Examiner* — Tri V Nguyen
(74) *Attorney, Agent, or Firm* — Sughrue Mion, PLLC

(57) ABSTRACT

A graphene dot structure and a method of manufacturing the same. The graphene dot structure includes a core including a semiconductor material; and a graphene shell formed on the surface of the core. The graphene dot structure may form a network.

11 Claims, 4 Drawing Sheets

(51) Int. Cl.
  *H01B 1/04* (2006.01)
  *B82Y 30/00* (2011.01)
  *B82Y 40/00* (2011.01)
  *C01B 32/186* (2017.01)
  *C01B 32/194* (2017.01)

(56) References Cited

U.S. PATENT DOCUMENTS

| | | | |
|---|---|---|---|
| 2009/0155161 | A1 | 6/2009 | Yoon et al. |
| 2009/0317637 | A1* | 12/2009 | Luhrs .............. H01M 4/134 428/403 |
| 2010/0090176 | A1 | 4/2010 | Kosowsky et al. |
| 2010/0215960 | A1* | 8/2010 | Luhrs .............. B01J 13/04 428/403 |
| 2010/0297502 | A1 | 11/2010 | Zhu et al. |
| 2011/0111227 | A1* | 5/2011 | Crocker ............. B82Y 30/00 428/392 |
| 2012/0267604 | A1* | 10/2012 | Tian ................. B82Y 10/00 257/9 |
| 2013/0099196 | A1 | 4/2013 | Wu et al. |
| 2015/0061161 | A1 | 3/2015 | Lee et al. |

FOREIGN PATENT DOCUMENTS

| | | |
|---|---|---|
| KR | 10-2009-0065205 A | 6/2009 |
| KR | 10-2009-0126058 A | 12/2009 |

OTHER PUBLICATIONS

Bardhan et al. ("Nanosphere-in-a-Nanoshell: A Simple Nanomatryushka." JPCC, 114, pp. 7378-7383, web Nov. 19, 2009).

Kim et al. ("Solar Photoconversion Using Graphene/TiO2 Composites: Nanographene Shell on $TiO_2$ Core versus $TiO_2$ Nanoparticles on Graphene Sheet." JPC C, 116(1), p. 1535-1543, online Nov. 19, 2011).

\* cited by examiner

GRAPHENE STRUCTURE AND METHOD OF MANUFACTURING THE SAME

CROSS-REFERENCE TO RELATED APPLICATIONS

The present application is a divisional of U.S. application Ser. No. 13/681,955 filed Nov. 20, 2012, which claims the benefit of priority from Korean Patent Application No. KR 10-2011-0124398, filed on Nov. 25, 2011, the contents of which are herein incorporated by reference in their entirety.

BACKGROUND

1. Field

The present disclosure relates to graphene structures and methods of manufacturing the same.

2. Description of the Related Art

Carbon material exists in various forms such as graphite, buckyball, carbon nanotube (also known as "CNT"), graphene, and the like. The buckyball has a ball structure formed of 60 carbon atoms, and is an allotrope, which is referred to as fullerene. A Molecule structure of the buckyball is formed of 15 pentagons and 20 hexagons, each pentagon being surrounded by hexagons. Carbon nanotube (CNT) is a material in which carbon atoms are combined in a hexagon honey-comb pattern to form a tube structure having a diameter as small as a single digit nanometer in case of a single wall nanotube. of a nanometer level. Graphene, which is another allotrope of carbon, has a structure of one-atom-thick planar sheets of $sp^2$-bonded carbon atoms that are densely packed in a honeycomb crystal lattice. The crystalline or "flake" form of graphite consists of many graphene sheets stacked together. The carbon-carbon bond length in graphene is about 0.142 nm. Graphene is the basic structural element of some carbon allotropes including graphite, charcoal, carbon nanotubes and fullerenes. Due to its unique structure of two dimension, graphene differs from most conventional three-dimensional materials: it has high electron mobility at room temperature, high opacity for an atomic monolayer, excellent thermal characteristics, chemical stability, a large surface area, and reportedly the greatest mechanical strength (breaking strength and tensile modulus).

Recently, research has been actively conducted on applying graphene to various fields such as nanoelectronics, optoelectronics, chemical sensors, and the like. Graphene may be synthesized by using chemical vapor deposition (CVD), using a transition metal such as nickel, copper, or the like as a catalyst. In addition, graphene may be obtained by separating graphite layer by layer. Graphene is generally used in a sheet form, but may be made and used in a tube form too.

SUMMARY

Provided are graphene structures and methods of manufacturing the same.

Additional aspects will be set forth in part in the description which follows and, in part, will be apparent from the description, or may be learned by practice of the presented embodiments.

According to an aspect of the present invention, a graphene dot structure includes: a core of a semiconductor material; and a graphene shell formed on the surface of the core.

The semiconductor material may include a IV group semiconductor, a III-V group semiconductor, or a II-VI group semiconductor.

The core may have a diameter in the range of about 1 nm to about 10 μm, and the graphene shell may have one or more layers.

The core may include: a first core; and a second core formed on the first core and including the semiconductor material. The first core may include a non-conductive material or a metal.

According to another aspect of the present invention, a method of manufacturing a graphene structure includes synthesizing the graphene ball structure via chemical vapor deposition (CVD) by using a gas including a semiconductor material and a gas including carbon.

The synthesizing of the graphene dot structure may include: introducing the gas including the semiconductor material and the gas including the carbon in a reaction chamber; forming the core having the ball shape and including the semiconductor material; and forming the graphene shell graphene on the surface of the core.

The method may further include removing the core from the graphene dot structure.

The gas including the semiconductor material may include $GeH_4$ gas and the gas including the carbon may include $CH_4$ gas.

The temperature of the reaction chamber may be maintained in the range of about 200° C. to about 900° C., and the pressure of the reaction chamber may be maintained in the range of about 0.1 Torr to about 300 Torr.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
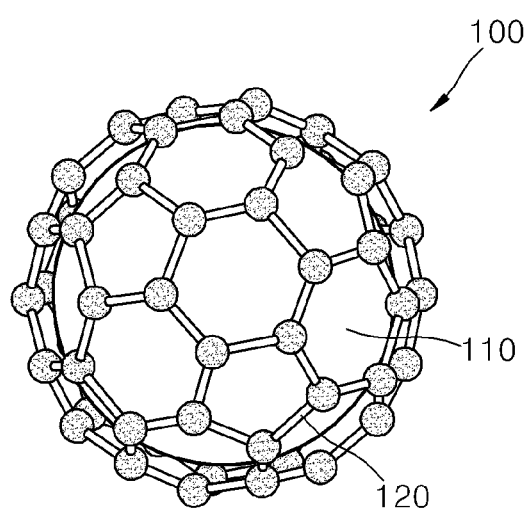
FIG. 1 is a perspective view illustrating a graphene dot structure according to an exemplary embodiment of the present invention.

The term "graphene dot structure" or "graphene dot" as employed herein indicates a structure having a core material and a graphene layer on the core material or a material having the structure. The structure may be in a size of from a single digit nanometer to tens micrometers. In an exemplary embodiment, the structure may be a particle. The particle may have a shape of sphere, ball, or similarly round shape. In another embodiment, the particle may have irregular shapes. The term "network of graphene dot" or "graphene dot network" or "graphene dot network structure" employed herein indicates a structure of multiple graphene dots which each connected to others. The network may be, but is not limited to, in a form of an aggregated particle, a sheet, a film, and the like.

The term "graphene cage" or "graphene inclusion body" as used herein indicates a graphene structure having an internal empty space and thus is capable of including, holding or capturing a substance which has a size and can fit into the space. In an embodiment, a graphene cage may be formed by removing the core from the graphene dot structure.

In the application, the term "graphene structure" is used broadly to refer to "graphene dot structure," "graphene cage," "graphene dot network," and/or "a network of graphene cages."

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 2:
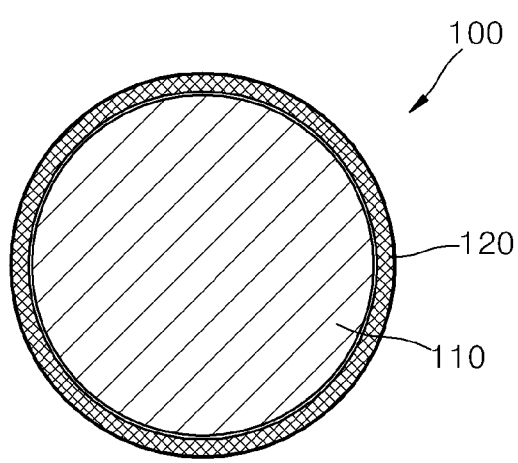
FIG. 2 is a cross-sectional view of the exemplary graphene dot structure illustrated in FIG. 1.

FIG. 1 is an illustrative view of a graphene dot structure 100 according to an exemplary embodiment of the present invention. FIG. 2 is an illustrative cross-sectional view of the graphene dot structure 100 illustrated in FIG. 1. While FIGS. 1 and 2 show a spherical shaped graphene dot, the graphene dots according to embodiments of the invention may have different shapes than a sphere. Any form of particles may be formed. In an embodiment, the graphene dots may have a spherical shape.

Referring to FIGS. 1 and 2, the graphene dot structure 100 includes a core 110 and a graphene shell or layer 120 on the surface of the core 110. The core 110 may be formed of a semiconductor material. The semiconductor material may include, for example, a IV group semiconductor such as germanium, a III-V group semiconductor, or a II-VI group semiconductor. The size of the core 110 may vary depending on desired uses. For example, the core 110 may have an average size from about 1 nm to about 10 μm. However, the present invention is not limited thereto. The size of the core 110 may be controlled by adjusting the manufacturing conditions such as the concentration of the core material, temperature, pressure, and the like. For example, when the reaction temperature is set to be about 400° C. or higher, a plurality of cores formed may aggregate to form a larger particle of core. The shell 120 is a graphene layer formed on the outer surface of the core 110. The graphene shell 120 may have a single layer or multi-layer structure. Graphene is a material which has a structure in which carbon atoms are two-dimensionally connected to each other and which has a very thin thickness of an atomic level. Graphene has high electric charge mobility and excellent thermal characteristics, is chemically stable, and has a large surface area.

Figure 3:
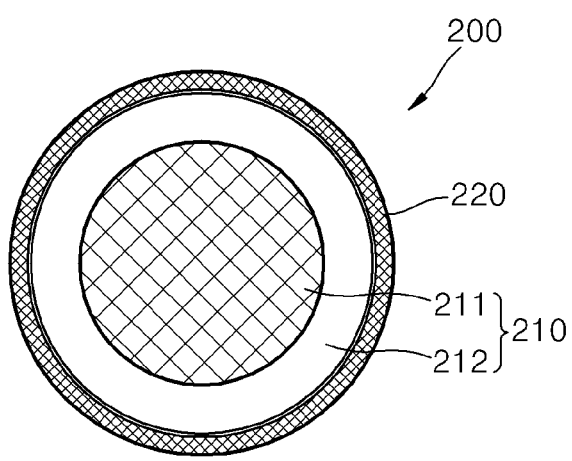
FIG. 3 is a cross-sectional view of a graphene dot structure according to an exemplary embodiment of the present invention.

FIG. 3 is an illustrative cross-sectional view of a graphene dot structure 200 according to an exemplary embodiment of the present invention.

Referring to FIG. 3, the graphene dot structure 200 includes a core 210 and a graphene shell 220 which is formed on the outer surface of the core 210. The core 210 may include a first core 211 and a second core 212 surrounding the first core 211. For example, the first core 211 may be formed of a non-conductive material or a metal. However, the present invention is not limited thereto, and the first core 211 may be formed of various materials. The second core 212 may include a semiconductor material. The semiconductor material, as stated above, may include a IV group semiconductor such as germanium, a III-V group semiconductor, or a II-VI group semiconductor. The size of the core 210 including the first and second cores 211 and 212 may vary. For example, the core 210 may have an average size from about 1 nm to about 10 μm. However, the present invention is not limited thereto. The graphene shell 220 is formed on the outer surface of the semiconductive core 210, that is, on the outer surface of the second core 212. As stated above, the graphene shell 220 may have a single layer or multi-layer structure.

The graphene dot structure 100 or 200 may have same or substantially same properties of graphene, such as high electric charge mobility, excellent thermal characteristics, and the like. The graphene dot structure 100 or 200 may be used in an energy field of high efficiency and high reactivity, since it has a large surface area due to the three-dimensional structure. In addition, the size of the graphene dot structure 100 or 200 may be variously controlled as described below, and the graphene dot structure 100 or 200 may be used in various fields depending on the size thereof.

Figure 4:
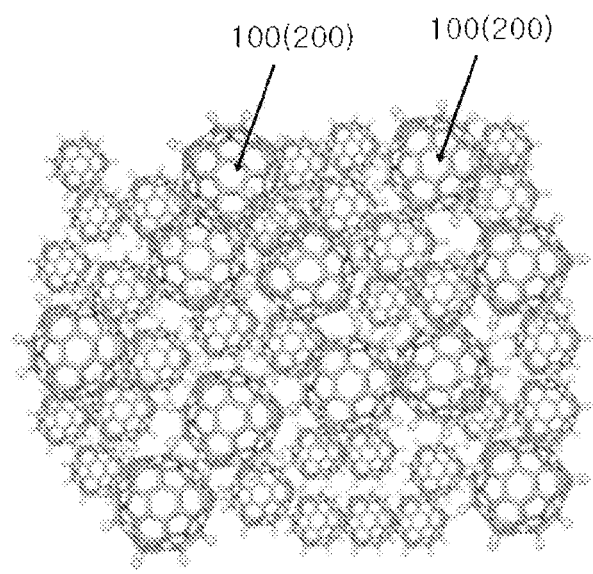
FIG. 4 is a diagram illustrating a graphene dot network according to an exemplary embodiment of the present invention.

FIG. 4 is a diagram illustrating a graphene dot network according to an exemplary embodiment of the present invention.

Referring to FIG. 4, a plurality of graphene dot structures 100 or 200 may be connected with each other to form a stacked structure and/or extended horizontally, thereby forming a network of graphene dots. The graphene dot network has a larger surface area, and thus, the reactivity thereof is increased. The graphene dot structure 100 or 200 or the graphene dot network may be used as an electrode or a conductive layer in a lithium ion battery, a hydrogen storage apparatus, a sensor, a capacitor, an optical device, an electronic device, or the like.

Figure 5:
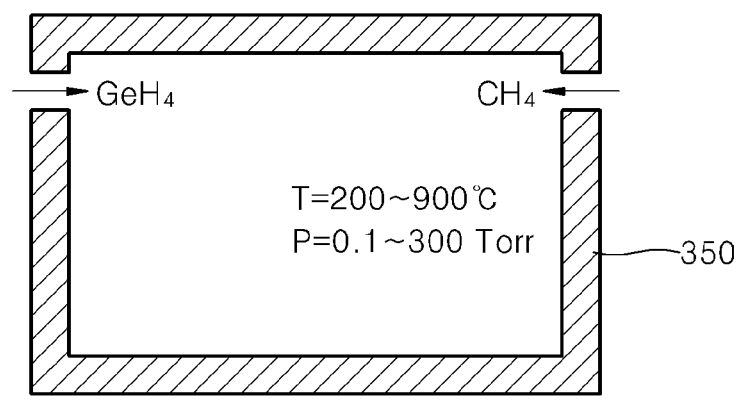
FIGS. 5 and 6 are diagrams for explaining a method of manufacturing a graphene dot structure, according to an exemplary embodiment of the present invention.
Figure 6:
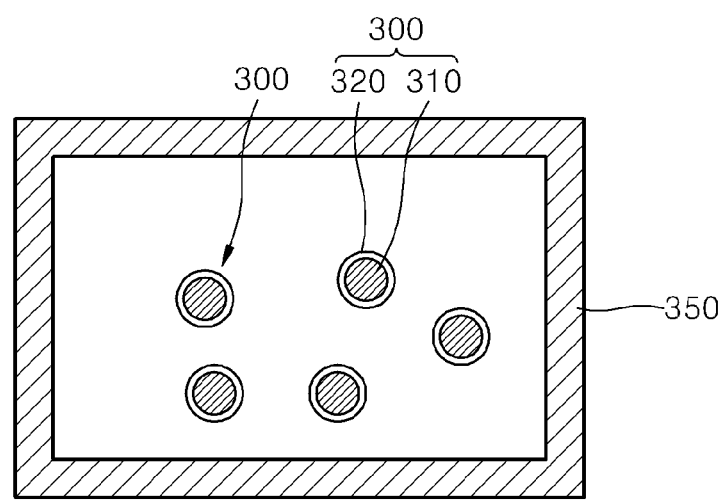

FIGS. 5 and 6 are diagrams for explaining a method of manufacturing a graphene dot structure, according to an exemplary embodiment of the present invention. In the current embodiment, the graphene dot structure is synthesized by using chemical vapor deposition (CVD).

Referring to FIG. 5, a gas including a semiconductor material, which forms a core, and a gas including carbon flows in a reaction chamber 350. The semiconductor material may include a IV group semiconductor, a III-V group semiconductor, or a III-VI group semiconductor. For example, $GeH_4$ gas may be used as the gas including the semiconductor material, and $CH_4$ gas may be used as the gas including the carbon. However, the present invention is not limited thereto. The reaction chamber 350 maintains a predetermined temperature T and a predetermined pressure P. The predetermined temperature T of the reaction chamber 350 may be, for example, in the range of about 200° C. to about 1,000° C., and the predetermined pressure P of the reaction chamber 350 may be, for example, in the range of about 0.1 Torr to about 300 Torr. However, the present invention is not limited thereto. In an embodiment, a temperature of about 600-1000° C. and a pressure of 0.1-200 Torr may be employed.

Due to the difference in the solid-solubility of the core semiconductor material and of the carbon, semiconductor material core is formed and graphene is grown on the outer surface of the core. Thus, as illustrated in FIG. 6, a graphene dot structure 300, which includes a core 310 formed of the semiconductor material and a graphene shell 320 on the surface of the core 310 may be formed. The size of the core 310 may be controlled by controlling the amount of the gas including the semiconductor material, the amount of the gas including the carbon, the temperature of the reaction chamber 350, or the like. For example, when the reaction temperature is set to be about 400° C. or higher under certain pressure condition, a plurality of cores formed from the semiconductor material may aggregate to form a larger particle of core, before a graphene shell is formed on individual cores. The size of the core 310 may be controlled so as to have a diameter in the range of about 1 nm to about 10 μm. The graphene shell 320, which is formed on the outer surface of the core 310, may have a single layer or multilayer structure.

In an exemplary embodiment, the core 310 may be removed the graphene dot structure through oxidization or dissolution using a dissolvent, leaving an empty graphene shell 320. For example, in an embodiment, the core made of Ge may be removed by various wet etching method. Hydrogen peroxide or deionized water may be used as an etchant in the wet etching process, without affecting the physicochemical properties of graphene. In another embodiment, the core material may be removed by vaporizing the core material at high temperature (e.g., about 800-900° C. in case of Ge core) and a low pressure (e.g. about 10-30 Torr in case of Ge core). Thus formed empty graphene shell 320 may be used as a graphene cage into which other atoms or materials may be included or trapped to form an inclusion body.

Hereinabove, a method of manufacturing the graphene dot structure 300 which includes the semiconductor core 310 and the graphene shell 320 has been explained. If non-conductive particles (not shown) or metal particles (not shown) of a certain diameter exist in the reaction chamber 350, the non-conductive particle or metal particle may serve as a first core 211 (FIG. 3) and a second core 212 of a semiconductor material may be formed on the surface of the first core 211. In addition, the graphene shell 220 may be formed on the surface of the semiconductor second core 212.

According to the embodiments of the present invention, it is possible to obtain graphene as nano- or micro-sized particles or dots, of which size may be controlled by adjusting the manufacturing conditions, including the concentrations of the core material and carbon, temperature, pressure, and the like. In addition, it is possible to form a network of graphene dots by stacking or connecting a plurality of graphene dot structures. For example, graphene dot structures fabricated as described above move in the pumping direction in chemical vapor deposition apparatus. The moving graphene dot structures may be stacked spontaneously on the substrate in the CVD apparatus due to gravity. Alternatively, the fabricated graphene dot structures may be dispersed in various solvents and stacked on the substrate by filtering process. The stacked graphene dot structures may be annealed at a temperature of, for example, 500-900° C., which may cause a formation of bridges between the neighboring graphene dot structures. The graphene dot structure and the graphene dot network may have the characteristics of graphene, such as high electric charge mobility, excellent thermal characteristics, and the like. In addition, the graphene dot structure and the graphene dot network may be used in an energy field having high efficiency and high reactivity, due to having a large surface area due to a three-dimensional structure. In addition, the graphene dot structure and the graphene dot network may be used as an electrode or a conductive layer in a lithium ion battery, a hydrogen storage apparatus, a sensor, a capacitor, an optical device, an electronic device, or the like.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a graphene structure, the method comprising:
   providing a gas including a semiconductor material and a gas including carbon into a reaction chamber; and
   performing chemical vapor deposition to form a core of the semiconductor material and a shell of graphene on the surface of the core,
   wherein the gas including the semiconductor material comprises $GeH_4$ gas.

2. The method of claim 1, wherein the core is formed to have a diameter in the range of about 1 nm to about 10 μm.

3. The method of claim 1, wherein the graphene shell is formed to have one or more layers.

4. The method of claim 1, wherein the reaction chamber comprises a non-conductive material or a metal, and the semiconductor material is deposited onto the non-conductive material or the metal.

5. The method of claim 1, further comprising removing the core from the structure of the semiconductor core and the graphene shell.

6. The method of claim 5, wherein the removing comprises wet etching the semiconductor core.

7. The method of claim 5, wherein the removing comprises vaporizing the semiconductor core at a temperature and a pressure allowing the vaporization of the semiconductor core.

8. The method of claim 1, wherein the gas including the carbon comprises $CH_4$ gas.

9. The method of claim 1, wherein the temperature of the reaction chamber is maintained in the range of about 200° C. to about 900° C.

10. The method of claim 1, wherein the pressure of the reaction chamber is maintained in the range of about 0.1 Torr to about 300 Torr.

11. The method of claim 1, further comprises forming a network of a plurality of the formed structures of the semiconductor core and the graphene shell.

* * * * *